No. 780,953. PATENTED JAN. 24, 1905.
F. McCARTHY.
LUBRICATING ATTACHMENT.
APPLICATION FILED MAR. 7, 1904.

Witnesses
F. C. Barry.
F. C. Crook.

Inventor
Felix McCarthy.
By W. S. Fitzgerald
Attorney

No. 780,953. Patented January 24, 1905.

UNITED STATES PATENT OFFICE.

FELIX McCARTHY, OF POTTSTOWN, PENNSYLVANIA.

LUBRICATING ATTACHMENT.

SPECIFICATION forming part of Letters Patent No. 780,953, dated January 24, 1905.

Application filed March 7, 1904. Serial No. 196,912.

*To all whom it may concern:*

Be it known that I, FELIX McCARTHY, a citizen of the United States, residing at Pottstown, in the county of Montgomery and State of Pennsylvania, have invented certain new and useful Improvements in Lubricating Attachments; and I do hereby declare the following to be a full, clear, and exact description of the invention, such as will enable others skilled in the art to which it appertains to make and use the same.

My invention relates to a lubricating attachment commonly designated a "grease-cup;" and it consists of certain specified details of construction and combination of parts, all of which will be hereinafter clearly presented, my object being to provide a lubricating attachment of the character specified which, while especially efficient and valuable for almost every purpose for which such an appliance is required, will be found more particularly applicable for use in connection with steam-chests and all varieties of bearings having a temperature near the melting-point of tallow and lubricant compounds prepared in connection therewith.

The essential feature of my invention consists in providing means for readily removing the lubricant-receptacle, whereby it may be replenished from time to time as required.

Further objects and advantages will be hereinafter clearly set forth, and illustrated in the accompanying drawings, in which—

Figure 1:
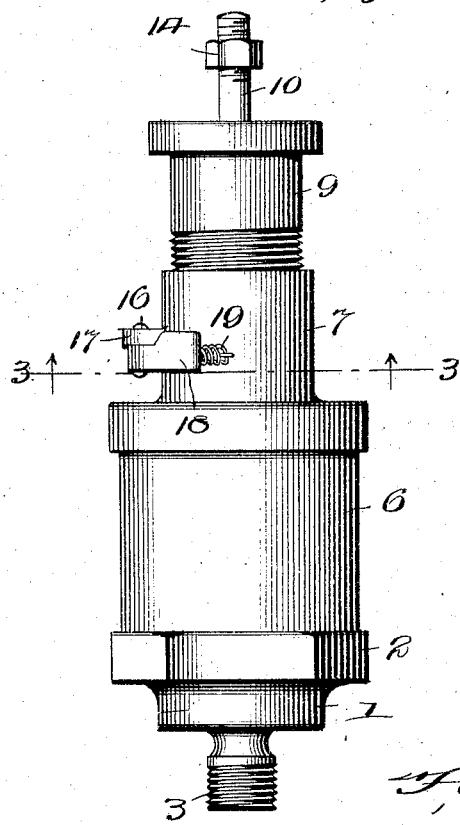
Figure 2:
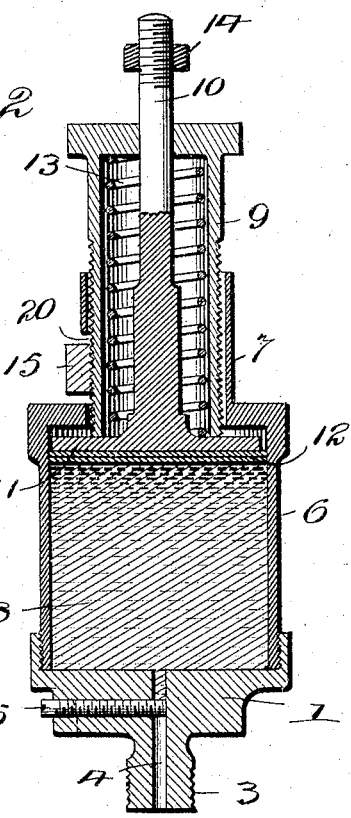
Figure 3:
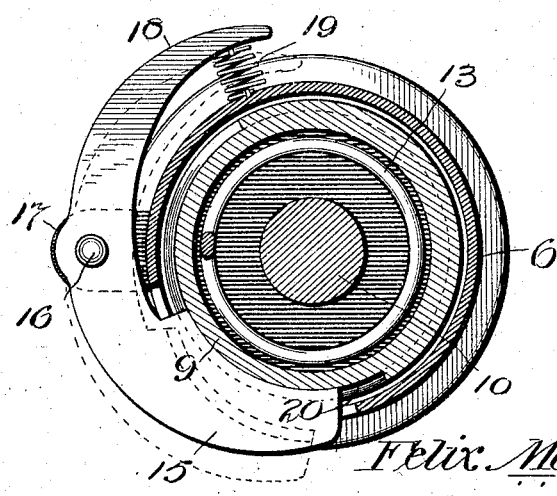

Figure 1 shows a side elevation of my lubricating attachment complete ready to be applied to use upon a steam-chest or bearing. Fig. 2 is a central sectional view thereof. Fig. 3 is a transverse section taken on line 3 3 of Fig. 1.

In materializing my invention I provide the base member 1, having the upwardly-extending internally-threaded flange 2 and the threaded anchoring-terminal 3, adapted to be screwed into a suitable seat reaching into communication with the bearing or the steam-chest, as the case may be.

The base member 1 is provided with the centrally-disposed bore or duct 4 and also with a threaded aperture in which I dispose the threaded stem or valve 5, said threaded stem being so located as to intersect the duct 4 and wholly or partially close the same, as desired. The lubricant-holder or body-section 6 is of proper size and threaded at its lower open end to be received by the flange 2, the said body portion having the tubular extension 7 upon its upper end, the bore of the extension 7 being open and communicating with the interior of the receptacle or body portion 6, in which I place a non-liquid lubricant 8, as tallow or any lubricating compound commonly used. The tubular extension 7 is designed to receive the member 9, which is open at its inner end and is provided at its outer end with a centrally-disposed aperture designed to receive the stem or piston-rod 10, said stem being connected to or integrally formed with the piston 11, which is of proper size to snugly fit within the casing or body portion 6 and is intended to bear upon the lubricant 8 and draw the same downward through the duct 4 and thence into the bearings, steam-chest, or valve, as the case may be. I also provide the snugly-fitting disks or washers 12, made of some suitable material, which will prevent the lubricant from passing between the edges thereof and the walls of the casing 6, and in order to hold the piston normally downward I provide the controlling-spring 13, the upper end of which bears against the outer end of the member 9, while the lower end is disposed in engagement with the upper surface of the piston 11. The piston-rod is held against moving inward to an undue extent by the nut 14 or other equivalent device.

It will be seen that the lower portion of the member 9 is externally threaded, said threads being designed to coöperate with the threaded face of the locking member 15, said member being pivotally held in its operative position, as by the rivet 16 engaging with the bracket 17, carried by the outer surface of the tubular extension 7. The locking member 15 is provided with a controlling-handle 18, said handle being disposed normally outward by the compression-spring 19, resting between the end of the handle and a contiguous part of the tubular extension 7, and it is obvious that by moving the handle 18 inward the locking member 15 will be withdrawn from engagement with the threaded surface of the member 9, thereby permitting said member to be freely moved longitudinally within the tubular extension 7. I consider this feature a very valuable and important part of my invention, inasmuch as the tubular member 9 may be instantly withdrawn a proper distance from the tubular extension 7 by simply moving the locking member 15 outward, it being understood that a suitable opening 20 is provided in a contiguous part of the extension 7 whereby said locking member may reach through into engagement with the threads upon the member 9.

The locking member 15 has a curved inner face coincident with the outer periphery of the member 9 and is provided throughout its curved surface with threads which are adapted to engage the threads upon the member 9, whereby the said member 9 may be minutely adjusted upwardly or downwardly by slightly turning said member, the locking member 15 and the member 9 having the same relative coöperation with each other as have a threaded bolt and tap therefor. As before stated, however, when it is desired to move the member 9 to any great distance the result may be quickly accomplished by releasing the locking member 15 from engagement with the threads on the member 9.

When it is necessary to refill the receptacle 6 with lubricant, all that is required is to unscrew said receptacle from engagement with the flange 2, when the lubricating compound may be introduced through the open end of the casing and the casing restored into reengagement with said flange. Before the receptacle 6 is filled it will be understood that a pressure upon the handle 18 will release the member 9, so that it will be left free to moved outward by the tension of the spring 13, and after the receptacle has been filled and attached to the base member in the manner specified a proper tension may be applied to the piston 11 by first pressing upon the handle 18 and moving the member 9 inward sufficiently to compress the spring 13 against said piston, when by releasing the handle 18 the member 9 will be engaged and securely locked in an adjusted position, this operation being repeated and the member 9 forced farther inward from time to time as the lubricant is used.

It will thus be seen that I have provided a lubricant-receptacle for bearings, valves, &c., which may be very quickly removed and refilled at any time desired, and, moreover, I can provide any degree of force required to secure a perfect feed or forcing of the lubricant into the bearings. The piston is also very quickly operated and restored to its initial position in the outer end of the receptacle by a simple pressure upon the controlling-handle 18. My valve may therefore be readily filled even while the engine is in motion, since the valve 5 will prevent any escape of steam in cases where my lubricant-receptacle is applied to a steam-chest or a valve. As soon, therefore, as the casing is again screwed home into engagement with the flange the grease is pressed down until the nut on the piston-rod is at a proper point thereon and a sufficient distance away from the spring barrel or member 9, the said barrel answering the double purpose of housing and steadying the spring and means for coöperating with the locking member 15. By observing the position of the nut 14 relative to the end of the spring barrel or member 9 the engineer may at all times readily know exactly how the lubricant is being fed or exhausted and that when the nut 14 is in engagement with the end of the member 9 he will know that said member should be again moved inward, which, as before explained, can be easily accomplished by releasing the locking member 15 from engagement with the walls thereof.

Believing that the advantages and manner of using my invention have thus been clearly presented, further description is deemed unnecessary.

What I claim as new, and desire to secure by Letters Patent, is—

1. The herein-described lubricant attachment or grease-cup, comprising a base portion having an anchoring-stem and a flange, a casing adapted to be connected with said base and having upon its upper end a tubular extension, a piston fitting within the casing and having a stem directed outward through said tubular extension, a member 9 open at its inner end and having an aperture in its outer end through which said stem loosely extends, a locking member 15 pivotally secured to said tubular extension, said member having a curved inner face coincident with the periphery of the member 9 and threaded, to coöperate with the threads on said member 9, said locking member 15 also having a curved handle portion and a spring interposed between said handle portion and tubular extension, whereby said member 15 will be held normally in engagement with the member 9, all combined substantially as set forth.

2. The herein-described lubricant attachment comprising a casing having a tubular extension at its upper end and a base portion secured to its lower end, an exteriorly-threaded member 9 adapted to enter said tubular extension, a locking member 15 pivotally secured to said tubular extension, said locking member having a curved inner face coincident with the outer wall of the member 9, said curved face being threaded throughout its length and adapted to coöperate with the thread upon the member 9 and means to move said locking member into or out of engagement with said member 9, whereby said member 9 may be moved upwardly or downwardly at will, as set forth.

In testimony whereof I have signed my name to this specification in the presence of two subscribing witnesses.

FELIX McCARTHY.

Witnesses:
 ALDES J. BERNHART,
 L. B. KEIN.